(No Model.) 2 Sheets—Sheet 1.

G. C. TOWLE.
STAND FOR BICYCLES.

No. 418,829. Patented Jan. 7, 1890.

WITNESSES.
J. A. Enright Jr
Nathl. C. Fowler, Jr

INVENTOR.
George C. Towle
By Charles E. Pratt
Atty (No Model.) 2 Sheets—Sheet 2.
G. C. TOWLE.
STAND FOR BICYCLES.

No. 418,829. Patented Jan. 7, 1890.

WITNESSES.
J. A. Enright Jr.
Nath'l C. Fowler, Jr.

INVENTOR.
George C. Towle
By Charles E. Pratt
Atty

UNITED STATES PATENT OFFICE.

GEORGE C. TOWLE, OF HYDE PARK, MASSACHUSETTS, ASSIGNOR TO THE POPE MANUFACTURING COMPANY, OF PORTLAND, MAINE.

STAND FOR BICYCLES.

SPECIFICATION forming part of Letters Patent No. 418,829, dated January 7, 1890.

Application filed September 13, 1889. Serial No. 323,835. (No model.)

*To all whom it may concern:*

Be it known that I, GEORGE C. TOWLE, of Hyde Park, in the county of Norfolk and Commonwealth of Massachusetts, have invented certain new and useful Improvements in Stands for Bicycles, Safeties, and other Velocipedes, of which the following is a specification.

Heretofore various devices have been constructed and used for holding bicycles upright, either by supplying a base of rigid metallic construction with rods extending therefrom to the crank-axle or in the form of a base with jointed leaves or end portions for holding one of the wheels at the bottom and at one or more points on the rim and tire of the wheel, or by fixing appliances to the floor or to the wall, or both, of the room in which they are to be held; but these devices have been found complicated in construction, unsteady, and uncertain in use, and expensive to make. Moreover, there has been, so far as I am aware, no provision made in any of them for securing the bicycle therein to prevent theft or displacement.

It is the object of my present improvements, first, to provide a steady, firm, simple, and efficient stand, at utmost economy of space and expense, adapted particularly for use in holding safety-bicycles, but applicable also for holding other machines, and, second, to provide this stand with a device for locking or securing the bicycle therein.

The manner in which I carry out my improvements will be best understood from the following description, taken in connection with the drawings, in which—

Figure 1:
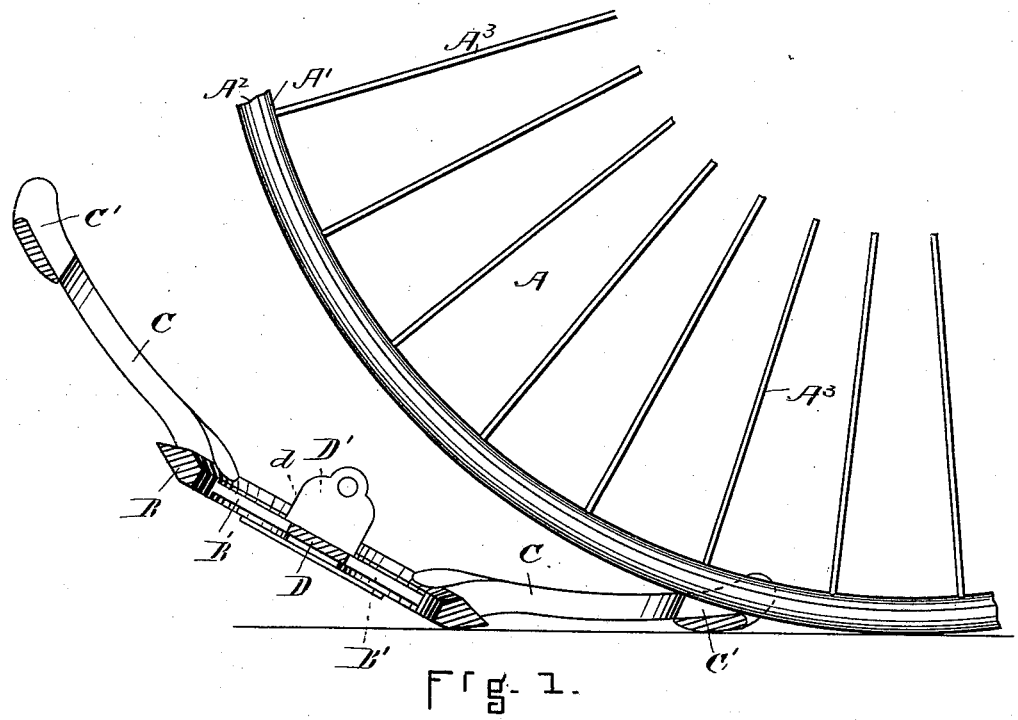
Figure 2:
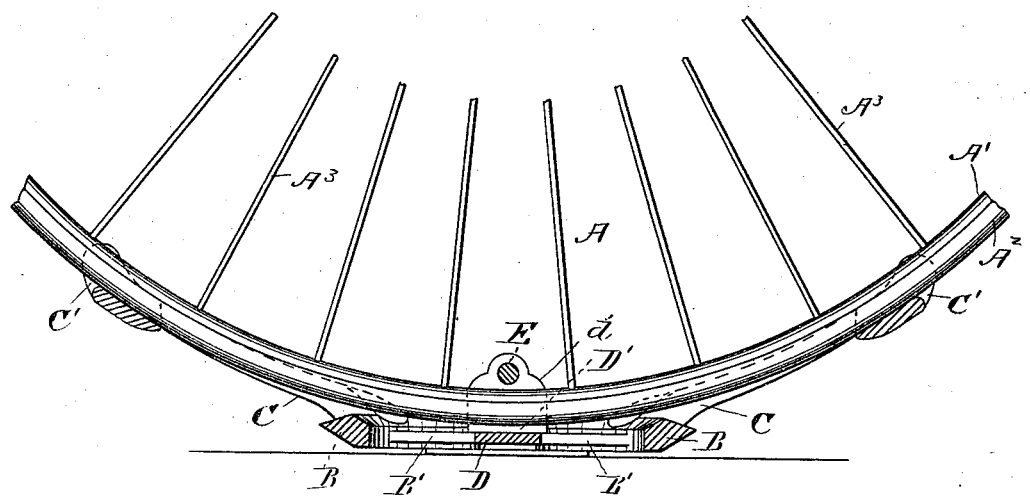
Figure 2:
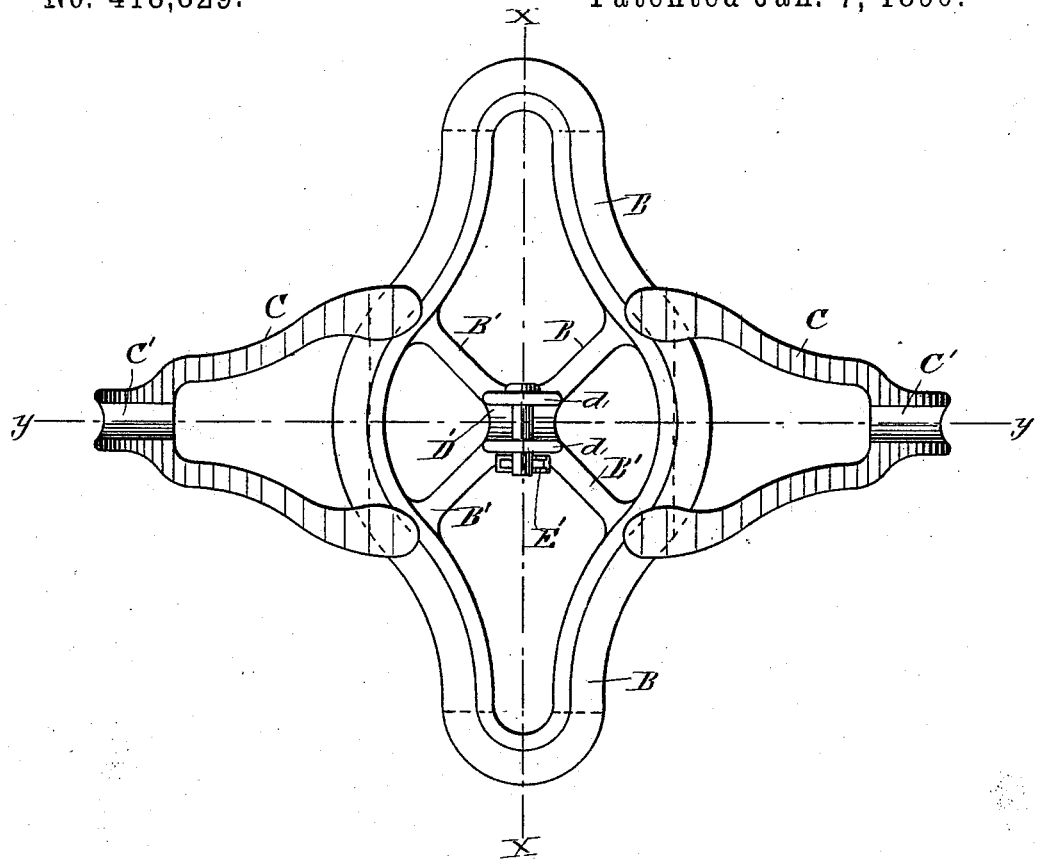
Figure 4:
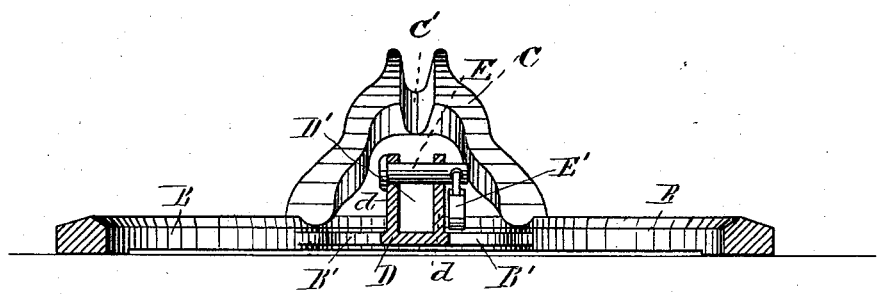

Figure 1 represents in elevation part of a wheel of a bicyle, and in vertical longitudinal section a stand embodying my improvements in one form, with one arm tilted down in the position given to the stand when the wheel is being run into or run out of the same. Fig. 2 shows my improved stand in top plan view. Fig. 3 shows the same with a wheel secured in position therein, but in vertical section on the line $y\,y$ of Fig. 2; and Fig. 4 shows the same stand in vertical section on the line $x\,x$ of Fig. 2, without any wheel therein, but with the locking device in position.

A is a safety-bicycle wheel having a felly A', tire $A^2$, and spokes $A^3$, of any ordinary construction or size.

B is the base portion of my improved stand, which I prefer to make of cast-iron, of a curved shape, with its greatest length transversely of the plane of the machine to be held in it open in the middle portions, but of sufficient spread and of such construction on the bottom as to give it a steady support on the floor. I further construct it with the reaches B' B' B' B', connected across the middle part and supporting the central block D. The block or trip D, I insert in or secure to the reaches B' in any suitable manner, and I construct it with the standards $d\,d$, having a groove D' between them of sufficient width and depth to receive the bolt or pin E and the rim and tire of a bicycle-wheel. Below it on the base portion B, I construct, preferably by casting the same solid therewith, the upward-rising curved holding-arms C C, each having a groove C', in line with the other and with the central groove D', and of sufficient depth and suitable shape to receive and hold the tire and rim of a bicycle-wheel.

I do not find it necessary with my present improvements to provide any adjustment in height or longitudinal position of either of these arms C, though of course such adjustment may be provided for, since they may be so proportioned with their grooves as to hold wheels of different sizes, varying only a few inches in diameter; and if a greater variation is to be provided for in the diameter of wheels it is better to provide therefor by different stands constructed otherwise similar to the one described, but for either a larger or smaller average size of wheel to be held therein.

E is a pin or bolt passing through the uprights D' D', which may be secured by a lock E' or any other device to prevent the wheel when detained therein, as shown in Fig. 3, from being withdrawn, except by unlocking or removal of the pin E.

By constructing the base part of this stand with its larger dimension transverse to the plane of the wheel and its shorter dimension longitudinal with the wheel I am able to get a steady width of base to prevent the bicycle from tipping over to one side, and also to effect a ready tilting of the stand to receive or to discharge the wheel, as shown in Fig. 1. By constructing the base of cast metal I give it weight enough to make it steady and strong, and yet, by the curves of construction shown, not too heavy for portability. By combining with it the pin and lock, as described, I am able to secure the wheel in the stand, and so prevent either accidental or intentional withdrawing of the wheel from the stand, and make it safe against theft, since the wheel could not be ridden with the stand locked to it, nor be easily carried off.

It is obvious that I may modify in details of construction the curves or the grooves or the arrangement of arms or of the support without departing from the substance of my invention, and I do not mean to limit myself precisely to the things described and shown.

I claim as new and of my invention—

1. An improved bicycle-stand constructed, substantially as herein set forth, with a base portion B, of greatest length transverse to the plane of the machine to be held, and with the reaches B' B' and central block D, and with the upward-rising holding-arms C C, and with grooves C' C' D', all combined to operate substantially as set forth.

2. In a velocipede-stand, a groove, as D, with uprights, as D' D', and a locking device or devices, as $d\,d$ E E', substantially as set forth.

3. The combination, in a bicycle-stand, of the base B, longitudinal arms C C, grooves C' C' D', uprights $d\,d$, pin E, and lock E', constructed to operate essentially as set forth.

GEO. C. TOWLE.

Witnesses:
NATHL. C. FOWLER, Jr.,
J. A. ENRIGHT, Jr.